United States Patent
Martin (10) Patent No.: US 7,064,707 B2
(45) Date of Patent: Jun. 20, 2006

(54) SATELLITE-BASED POSITIONING RECEIVER WITH CORRECTION OF CROSS CORRELATION ERRORS

(75) Inventor: Nicolas Martin, Bourg les Valence (FR)

(73) Assignee: Thales, Neuilly Sur Seine (FR)

( * ) Notice: Subject to any disclaimer, the term of this patent is extended or adjusted under 35 U.S.C. 154(b) by 0 days.

(21) Appl. No.: 10/521,107

(22) PCT Filed: Jul. 18, 2003

(86) PCT No.: PCT/FR03/02288

§ 371 (c)(1),
(2), (4) Date: Jan. 13, 2005

(87) PCT Pub. No.: WO2004/017089

PCT Pub. Date: Feb. 26, 2004

(65) Prior Publication Data

US 2005/0248483 A1   Nov. 10, 2005

(30) Foreign Application Priority Data

Aug. 13, 2002   (FR) .................................. 02 10276

(51) Int. Cl.
*H04B 7/185* (2006.01)

(52) U.S. Cl. .............................. 342/357.02; 342/357.12
(58) Field of Classification Search ........... 342/357.01, 342/357.02, 357.06, 357.12; 701/207, 213

See application file for complete search history.

(56) References Cited

U.S. PATENT DOCUMENTS

| | | | |
|---|---|---|---|
| 4,578,678 A * | 3/1986 | Hurd ..................... | 342/357.12 |
| 5,134,407 A * | 7/1992 | Lorenz et al. .............. | 342/352 |
| 5,535,237 A * | 7/1996 | LaPadula et al. ........... | 375/130 |
| 5,535,278 A * | 7/1996 | Cahn et al. ................. | 380/274 |
| 5,689,271 A * | 11/1997 | Lennen ................... | 342/357.12 |
| 5,694,416 A | 12/1997 | Johnson | |
| 6,313,786 B1 | 11/2001 | Krasner et al. | |
| 6,588,117 B1 | 7/2003 | Martin et al. | |
| 2002/0186794 A1 * | 12/2002 | Oesch et al. ................ | 375/340 |
| 2005/0008106 A1 * | 1/2005 | Dong-Sik ................... | 375/342 |

* cited by examiner

*Primary Examiner*—Dao Phan
(74) *Attorney, Agent, or Firm*—Lowe Hauptman & Berner, LLP (57) ABSTRACT

The invention relates to a satellite-based positioning receiver receiving signals from different satellites, comprising a correlation channel Cii per satellite received, each correlator channel Cii comprising: a correlation path, in-phase and quadrature, between the signal received and two respective local quadrature carriers (sine, cosine) generated by an oscillator with digital control of carrier; a code correlation path based on the signals I, Q output by the carrier correlation path, with the local codes provided by a digital generator of local codes; an integrator for providing, for each local code, signals $I_c$, $Q_c$ at the output of the correlator channel Cii of the satellite received, c designating each of the local codes, the receiver according to the invention comprises, for each correlator channel of the signal received from a satellite, as many additional correlator channels as additional satellites received, and the local punctual code of the satellite received is correlated with the local codes of the other additional satellites.

19 Claims, 6 Drawing Sheets

SATELLITE-BASED POSITIONING RECEIVER WITH CORRECTION OF CROSS CORRELATION ERRORS

CROSS-REFERENCE TO RELATED APPLICATIONS

The present Application is based on International Application No. PCT/FR2003/002288, filed on Jul. 18, 2003, which in turn corresponds to FR 02/10276 filed on Aug. 13, 2002, and priority is hereby claimed under 35 USC §119 based on these applications. Each of these applications are hereby incorporated by reference in their entirety into the present application.

FIELD OF THE INVENTION

Satellite positioning systems employ, for pinpointing, several satellites that transmit their positions via radio signals and a receiver placed at the position to be pinpointed, estimating the distances, called pseudo-distances, that separate it from the satellites on the basis of the propagation times of the satellite signals picked up and performing the pinpointing operation by triangulation. The more precisely the satellite positions are known by the receiver and the more precise the measurements of the pseudo-distances made by the receiver, the more precise the pinpointing obtained.

BACKGROUND OF THE INVENTION

The positions of the satellites are determined on the basis of a network of ground tracking stations independent of the positioning receivers. These positions are communicated to the positioning receivers via the satellites themselves, by data transmission. The pseudo-distances are deduced by the positioning receivers from the apparent delays exhibited by the received signals relative to the clocks of the satellites, which are all synchronous.

Although the precision in knowing the positions of the satellites of the positioning system is independent of the performance of a positioning receiver, this is not the case for the precision of the pseudo-distance measurements, which depends on the precision of the measurements of the signal propagation times at the receiver.

Radio signals transmitted by satellites travel large distances and, since they are transmitted at limited power levels, reach the receivers with very low power levels that are buried in radio noise due to the activity of terrestrial transmitters which are often powerful and much closer to the receivers than the satellites that they must receive. To make it easier to receive them, it has been attempted to make them the least sensitive possible to narrow-band interference, by increasing their bandwidths by means of the band spreading technique. The current systems, and those planned for the near future, for satellite positioning use, for the radio signals transmitted by their satellites, the technique of band spreading by modulation with the aid of pseudorandom binary sequences, a technique known as DSSS (Direct Sequence Spread Spectrum). This DSSS modulation consists, after having arranged the information to be transmitted in the form of a sequence of binary elements with a regular data rate, in multiplying each binary information element by a pseudorandom binary sequence of markedly faster data rate. The band spreading obtained is proportional to the ratio of the data rate of the sequence of binary data elements to the data rate of the pseudorandom binary spreading sequence.

The information to be transmitted from the satellites, once placed in the form of a frequency-spread sequence of binary data items by DSSS modulation, are transposed in the transmission frequency range by modulation with a transmission carrier. To make it easier to measure the signal propagation times at a positioning receiver and to avoid the presence of isolated lines in the spectra of the signals transmitted by the satellites, each pseudorandom binary sequence used for frequency spreading consists of binary elements of the same duration, taken to be equal to integer multiples of the periods of the transmission carriers, whereas the various data rates and frequencies used within the satellites are synchronized and derive from a very precise common clock.

Upon reception, the binary information contained in a radio signal from a satellite of a positioning system is extracted by two demodulations carried out in an intertwined manner, a first demodulation using a carrier generated locally by an oscillator controlled by a PLL (Phase Lock Loop) for transposing the signal received into baseband and a second demodulation using pseudorandom binary sequences generated locally by a pseudorandom binary sequence generator controlled by a so-called DLL (Delay Lock Loop) for despreading the binary information string present in the received signal.

The propagation times of the received signals are manifested, at reception, by delays that affect the pseudorandom binary sequences present in the received signals and the carrier modulating the received signal.

The delays affecting the pseudorandom binary sequences are accessible, modulo the duration of one of their binary elements, at the level of the feedback control signals of the DLLs. The delays observed by these loops allow unambiguous measurements, or those of low ambiguity, of the propagation times of the pseudorandom binary sequences since the numbers of complete pseudorandom sequences passing during the signal journeys is relatively small. This is referred to as code measurements.

For example, in the case of the GPS (Global Positioning System) satellite positioning system, the shortest pseudorandom binary sequence, that used for satellite signal spreading of the C/A (Coarse/Acquisition Code or Clear/Acquisition Code) type, is composed of 1023 binary elements with a data rate of 1023 MHz and a duration of one millisecond. Its total duration corresponds to a journey of 300 km for a radio wave and allows measurements of distance modulo 300 km. The 1 microsecond duration of each of its binary elements permits a precision of the order of 0.1 microseconds in the measurement of its delay at reception, corresponding to a 30 meter journey in the case of a radio wave. The ambiguity in the pseudo-distance measurements obtained from the pseudorandom binary sequence of a C/A code, due to the fact that measurements modulo 300 km are involved, is easy to resolve as soon as the receiver receives more than four satellites, as it is then possible to take various points on the same position from different sets of four satellites and to retain only the common solution. In the absence of such a possibility, the ambiguity may also be resolved using very rough prior knowledge of the position. Such a measurement ambiguity does not arise with P-type satellite signals of the GPS system, which use, for spreading them, a pseudorandom binary sequence of 266.41 days' duration, but these signals are not freely available to users.

Figure 1:
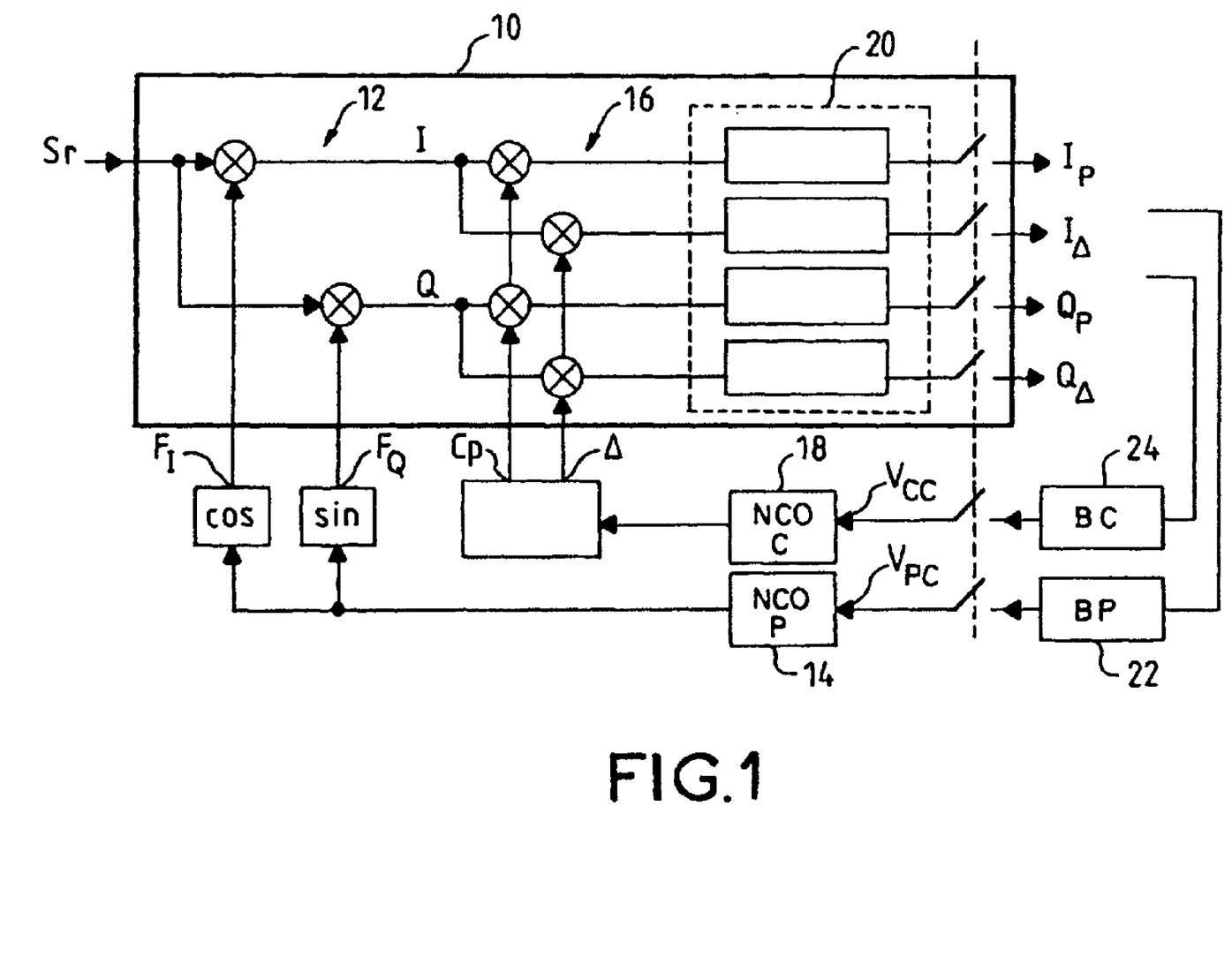
FIG. 1, already described, represents a receiver of the state of the art having a correlator channel.

FIG. 1 shows the schematic of a satellite-based positioning receiver of the prior art. The receiver comprises a correlator channel 10 driven by the signal received, originating on the one hand from the positioning satellites visible to the antenna of the receiver, and on the other hand from a disturbing source.

The correlator channel 10 comprises a correlation path 12 for in-phase and quadrature correlation between the signal received Sr and two respective local carriers $F_I, F_Q$. These quadrature local carriers (sine, cosine) are generated by an oscillator with digital control of carrier 14 (NCO p) of the receiver.

The signals I, Q output by the carrier correlation path are thereafter correlated in a code correlation path 16 with the local codes, punctual and delta, of the satellite considered, provided by a digital generator of local codes 18.

The code correlations are thereafter integrated by a respective integrator 20 so as to provide signals $I_P, I_\Delta, Q_P, Q_\Delta$ at the output of the correlator channel 10.

A carrier loop 22 and a code loop 24, of the receiver of the state of the art, embodied in a known manner, respectively provide on the basis of the signals $I_P, I_\Delta, Q_P, Q_\Delta$ at the output of the correlator channel 10, a carrier speed signal Vpc for controlling the oscillator with digital control of carrier (NCO p) 14 generating the two local carriers $F_I, F_Q$ and a code speed signal Vcc for controlling the oscillator with digital control of code 18 generating the local code, punctual and delta, for the code correlation path.

Satellite-based radio navigation requires means on the ground (ground segment) in order to monitor and correct the signals emitted by the satellites. The ground stations in particular use means of reception that provide code and carrier measurements. These measurements must be extremely accurate since they contribute to the ultimate performance of the system.

These measurements are marred by errors due to cross-correlations between the signals emitted by all the satellites visible from the ground stations. Specifically, although the spreading codes used are designed to distinguish the signals of the satellites by correlation, their decorrelations are not perfect on account of their limited length and of the Doppler due to the motion of the satellites. These errors may be perturbing when the codes are of short period (C/A codes) and when the speeds between the ground and the satellites are low. This is the case in particular for the GEO and SBAS (Space Based Augmented Systems, type WAAS or EGNOS) satellites: the small variation in the Doppler implies that these errors become slowly varying biases that cannot be filtered. They may reach several meters.

SUMMARY OF THE INVENTION

The idea of the invention is based on the use of additional correlation channels over and above the correlation channel of the signal received from a satellite so as to estimate in real time the cross-correlation errors, code-wise and carrier-wise, between the satellite concerned and any other satellite; which we track moreover on other channels and the position of the code and phase of whose carrier we therefore also know. These estimated errors may thus be corrected very simply in the tracking loops.

To this end the invention proposes a satellite-based positioning receiver with correction of inter-satellite cross-correlation errors, the receiver comprising a correlation channel Cii of order i per satellite received, with i=1, 2, ... N, N being the number of satellites received, each correlator channel Cii having:
  a carrier correlation path, in-phase and quadrature, between the signal received Sr and two respective local quadrature carriers (sine, cosine) generated by an oscillator with digital control of carrier (NCO p);
  a code correlation path based on the signals I, Q output by the in-phase and quadrature carrier correlation path, with the local codes of the satellite received, provided by a digital generator of local codes;
  an integrator for providing, for each local code, signals $I_c$, $Q_c$ at the output of the correlator channel Cii of the satellite received, c designating each of the local codes, characterized in that it comprises, for each correlator channel Cii of the satellite received as many additional correlator channels Cix as additional satellites received with x=1, 2, ... N and x different from i, and in that the local codes of the satellite received are correlated with the local codes of the other additional satellites Cix.

In one embodiment of the receiver according to the invention the local codes of the satellite received for the code correlation path are a punctual and delta code. The code correlation path in fact comprises two correlation paths:
  a punctual path $(I_P, Q_P)$,
  a delta path $(I_\Delta, Q_\Delta)$.

In another embodiment, the local codes of the satellite received for the code correlation path are an early, punctual and delta code. The code correlation path in fact comprises three correlation paths:
  an early path $(I_A, Q_A)$,
  a punctual path $(I_P, Q_P)$, and
  a late path $(I_R, Q_R)$, the delta path being reconstituted from the early path minus the late path by the formulae:

$$I_\Delta = I_A - I_R$$

$$Q_\Delta = Q_A - Q_R$$

In a first embodiment of the receiver according to the invention, receiving the N satellites, the receiver comprises N reception subsets Si. Each subset Si of rank i comprises the correlator channel Cii of the signal of the satellite received of order i, with i=1, 2, ... N, and N-1 additional correlator channels Ci1, ... Cix, ... CiN for the additional satellites received with x=1, 2, ... N and x different from i.

Each received signal correlator channel Cii is driven by its reception input Er by the signal received Sr. Each of the additional correlator channels of a subset Si receives respectively, on the one hand, at its received-signal input Er, a local signal Slox resulting from the modulation of the local carrier $F_{1x}$ by the punctual local code Cpx of the correlator channel Cxx of the satellite received of order x, and on the other hand, at its local carrier and local codes local inputs, the respective local quadrature carriers $F_{Ii}$, $F_{Qi}$ and the local codes Cpi and $\Delta i$ of the correlator channel Cii of the signal received from the satellite of order i.

BRIEF DESCRIPTION OF THE DRAWINGS

The invention will be better understood with the aid of an exemplary embodiment of a receiver according to the invention receiving more than two satellites with reference to the appended drawings, in which.

DETAILED DESCRIPTION OF THE PREFERRED EMBODIMENT

Figure 2:
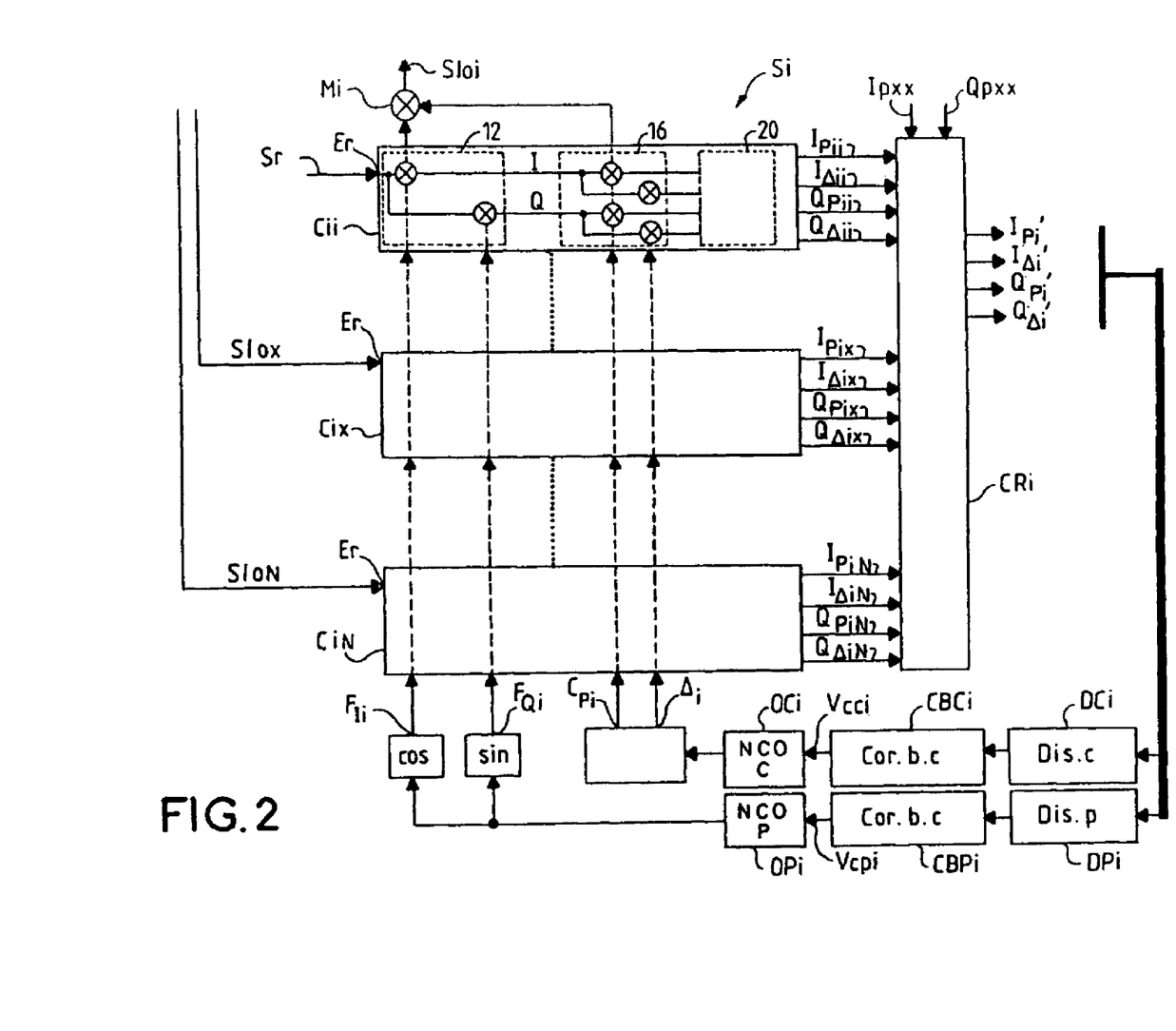
FIG. 2 shows a subset of a receiver according to the invention receiving N satellites.

FIG. 2 shows a subset of a receiver according to the invention receiving N satellites.

The receiver comprises N reception subsets for the N satellites received. Each subset Si of rank i, with i=2, 3, . . . N, comprises a correlator channel Cii for a satellite received Sati of order i and N-1 additional correlators Ci1, Cix, . . . CiN for the additional satellites Sat1, . . . Satx, . . . SatN, with x different from i. Each of these additional correlator channels Cix receives respectively, on the one hand, at its received-signal input, a local signal Slox resulting from the modulation of the local carrier $F_{ix}$ by the punctual local code Cpx of the correlator channel Cxx of the signal received from the satellite of order x, and on the other hand, at its local-carrier and local-codes inputs, the respective local quadrature carriers $F_{Ii},F_{Qi}$ and the local codes, punctual Cpi and delta $\Delta$i, of the correlator channel Cii of the signal received from the satellite of order i.

Like the received-signal correlator channel Cii, each additional correlator channel of rank x in the subset Si, if x=1, 2, . . . N comprises:
- the in-phase and quadrature carrier correlation path 12 between the signal received and two respective quadrature local carriers (sine, cosine);
- the code correlation path 16 based on the signals I, Q at the output of the in-phase and quadrature carrier correlation path with the punctual Cpi and delta $\Delta$i local codes of the satellite of order i;
- an integrator for providing signals $I_{Pix}, I_{\Delta ix}, Q_{Pix}, Q_{\Delta ix}$ at the output of the correlator channel.

The integrator of the received signal correlator channel Cii provides the signals $I_{Pii}, I_{\Delta ii}, Q_{Pii}, Q_{\Delta ii}$.

The subset Si furthermore comprises:
- an oscillator with digital control of carrier OPi(NCO p) for providing local carriers $F_{Ii}, F_{Qi}$ for the N correlators of the subset Si considered and a digital generator of local codes OCi (NCO c) for providing the local codes, punctual Cpi and delta $\Delta$i, for the N correlators of the subset Si considered;
- a multiplier Mi providing, for the other subsets Sx of the receiver, a local signal Sloi, resulting from the modulation of the local carrier $F_{Ii}$ by the punctual code Cpi of the subset considered Si, so as to perform the correlation of the code modulated by the carrier of the satellite considered with the codes modulated by the carrier of the other satellites;
- a correlation corrector CRi providing on the basis of the signals $I_{Pix}, I_{\Delta ix}, Q_{Pix}, Q_{\Delta ix}$ (x taking, for these signals $I_{Pix}, I_{\Delta ix}, Q_{Pix}, Q_{\Delta ix}$, the values 1 to N) at the output of the N correlator channels of the subset considered Si, and signals $I_{Pxx}, Q_{Pxx}$ output by the received-signal correlator channels of the other subsets Sx, with x different from i, corrected signals $I_{Pi}', I_{\Delta i}', Q_{Pi}' Q\Delta_{\Delta i}'$.
- a carrier discriminator DPi providing through a carrier loop corrector CBPi a control signal Vcpi for the oscillator with digital control of carrier (NCO p) so as to provide local carriers $F_{Ii}, F_{Qi}$ for the N correlators of the subset Si considered;
- a code loop discriminator DCi providing through a code loop corrector CBCi a control signal Vcci for the digital generator of local code OCi (NCO c) for providing the local codes, punctual Cpi and delta $\Delta$i for the N correlators of the subset Si considered.

We shall deal hereinbelow, by way of example, with the case of a receiver according to the invention, configured to receive three satellites (N=3).

Figure 3:
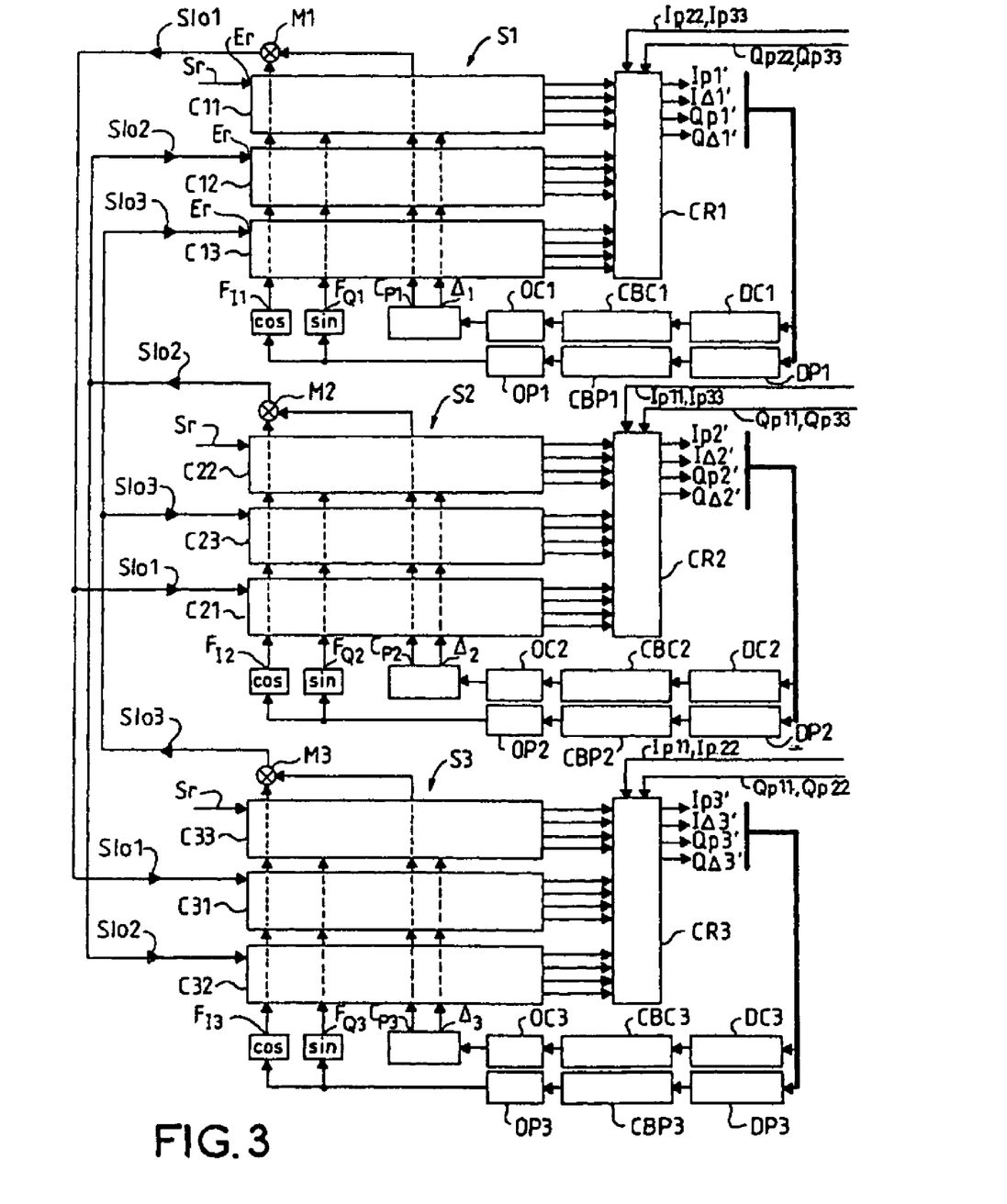
FIG. 3 shows a receiver, according to the invention, for three satellites.

FIG. 3 shows a receiver of three satellites comprising a first S1, a second S2 and a third S3 reception subsets having three correlator channels each. The reception subsets S1, S2 and S3 comprise the same elements as the detailed subset of FIG. 2.

The first S1, second S2, and third S3 subsets of the receiver of FIG. 3 respectively comprise a first C11, a second C22 and a third C33 signal correlator channels driven at their reception input Er by the signal Sr received by the receiver, each subset furthermore comprising:
- in the first subset S1, two other additional correlator channels C12 and C13 driven respectively at their reception input by local signals Slo2, Slo3 emanating respectively from a multiplier M2 and from a multiplier M3, the signal Slo2 resulting from the modulation of the local carrier $F_{I2}$ by the punctual code $Cp_2$ of the second satellite and the signal Slo3 resulting from the modulation of the local carrier $F_{I3}$ by the punctual code $Cp_3$ of the third satellite;
- in the second subset S2, two other additional correlator channels C21 and C23 driven respectively at their reception input by local signals Slo1, Slo3 emanating respectively from a multiplier M1 and from the multiplier M3, the signal Slo1 resulting from the modulation of the local carrier $F_{I1}$ by the punctual code $Cp_1$ of the first satellite;
- in the third subset S3, two other additional correlator channels C31 and C32 driven at their reception input by the local signals Slo1, Slo2 emanating respectively from the multipliers M1 and M2.

Each correlator of each of the subsets Si comprises:
- the in-phase and quadrature carrier correlation path 12 (see detail of the correlator in FIG. 2) between the signal at their reception input and two respective quadrature local carriers (sine, cosine), $F_{I1},F_{Q1}$ for the first subset $S_1$, $F_{I2},F_{Q2}$ for the second S2 and $F_{I3},F_{Q3}$ for the third S3, these carriers being generated respectively, for each of the subsets S1,S2, and S3 by a first OP1, a second OP2 and a third OP3 oscillators with digital control of carrier (NCO p);
- the code correlation path 16 based on the signals I, Q at the output of the in-phase and quadrature carrier correlation path with the local codes, punctual Cp1,Cp2, Cp3 and delta $\Delta 1, \Delta 2, \Delta 3$ of the satellites respectively of order 1, 2, 3, provided by a digital generator of local codes OC1, OC2 and OC3 respectively for each subset;
- an integrator per correlator channel for respectively providing signals $I_{P1x}, I_{\Delta 1x}, Q_{P1x}, Q_{\Delta 1x}$ at the output of the correlator channel C1x; $I_{P2x}, I_{\Delta 2x}, Q_{P2x}, Q_{\Delta 2x}$ at the output of the correlator channel C2x and $I_{P3x}, I_{\Delta 3x}, Q_{P3x}, Q_{\Delta 3x}$ at the output of the correlator channel C3x, with x=1, 2, 3.

Each subset of three correlators comprises:
- a corrector Cr1,Cr2,Cr3 of correlations providing on the basis of the signals $I_{Pix}, I_{\Delta ix}, Q_{Pix}, Q_{\Delta ix}$, with i=1, 2, 3 (and x=1, 2, 3), at the output of the 3 correlator channels of the subset considered S1,S2,S3 and of the signals $I_{Pxx}, Q_{Pxx}$ at the output of the received-signal correlator channels (of order x) of the other subsets Sx, of the corrected signals $I_{P1}', I_{\Delta 1}', Q_{P1}', Q_{\Delta 1}'$ at the output of the first corrector Cr1,$I_{P2}', I_{\Delta 2}', Q_{P2}', Q_{\Delta 2}'$ at the output of the second corrector Cr2, $I_{P3}', I_{\Delta 3}', Q_{P3}', Q_{\Delta 3}'$ at the output of the third corrector Cr3, the signals $I_{Pxx},Q_{Pxx}$ at the output of the received-signal correlator channels, driving the correctors, being the signals $I_{p2},I_{P33},Q_{P22}$, $Q_{P33}$ for the corrector Cr1, $I_{P11}, I_{P33},Q_{P11},Q_{P33}$ for the corrector Cr2 and $I_{P11}, I_{P22},Q_{P11},Q_{P22}$ for the corrector Cr3, a carrier discriminator DP1,DP2,DP3 respectively providing through a carrier loop corrector CBP1,CBP2, CBP3 a control signal Vcp1,Vcp2,Vcp3 for the respective oscillator with digital control of carrier OP1,OP2, OP3 (NCO p) so as to provide local carriers $F_{I1},F_{Q1}$, for the first subset S1, $F_{I2},F_{Q2}$, for the second subset S2 and $F_{I3},F_{Q3}$ for the third subset S3;

a code loop discriminator DC1,DC2,DC3 respectively providing through a code loop corrector CBC1,CBC2, CBC3 a respective control signal Vcc1,Vcc2,Vcc3 for the digital generator of local codes OC1,OC2,OC3 (NCO c) so as to provide the local codes, punctual and delta, Cp1,Δ1 for the three correlators of the first subset S1, Cp2,Δ2 for the three correlators of the second subset S2 and CP3,Δ3 for the three correlators of the third subset S3.

The receiver of FIG. 3 is configured to perform the following corrections:

For the satellite 1:
On the punctual path:

$$I_{P1}'=I_{P11}-I_{P22}.I_{P12}.2/T-I_{P33}.I_{P13}.2/T$$

$$Q_{P1}'=Q_{P11}-I_{P22}.Q_{P12}.2/T-I_{P33}.Q_{P13}.2/T$$

on the delta path:

$$I_{\Delta 1}'=I_{\Delta 11}-I_{P22}.I_{\Delta 12}.2/T-I_{P33}.I_{\Delta 13}.2/T$$

$$Q_{\Delta 1}'=Q_{\Delta 11}-I_{P22}.Q_{\Delta 12}.2/T-I_{P33}.Q_{\Delta 13}.2/T$$

i.e. in complex notation, with $j^2=-1$:

$$I_{P1}'+jQ_{P1}'=I_{P11}+jQ_{P11}-I_{P22}(I_{P12}+jQ_{P12}).2/T-I_{P33}(I_{P13}+jQ_{P13}).2/T$$

$$I_{\Delta 1}'+jQ_{\Delta 1}'=I_{\Delta 11}+jQ_{\Delta 11}-I_{P22}(I_{\Delta 12}+jQ_{\Delta 12}).2/T-I_{P33}(I_{\Delta 13}+jQ\Delta 13).2/T$$

with $$\frac{T}{2} = \int_0^T (\text{local signal}(t))^2 dt,$$

T duration of integration of the integrator 20 in FIG. 1.

Proof:

Remark: in the figures and, with the aim of making it simpler to read them, we shall write:

Punctual local code$_{satellite\ 1}$=Slo1

Punctual local code$_{satellite\ 2}$=Slo2

Punctual local code$_{satellite\ 3}$=Slo3

By construction:

$$I_{PI} = \int_0^T [\text{signal received}(t)]$$

[local $code_{satelite1}(t)$ · in-phase local $carrier_{satelite1}(t)]dt$ $$Q_{PI} = \int_0^T [\text{signal received}(t)]$$

[local $code_{satelite1}(t)$ · quadratura local $carrier_{satelite1}(t)]dt$ i.e., by expanding and neglecting noise:

$$I_{PI} = \int_0^T [A_1 \cdot code_1(t+\tau_1) \cdot \sin(\omega t+\varphi_1) + A_2 \cdot code_2(t+\tau_2) \cdot \sin(\omega t+\varphi_2) + A_2 \cdot code_2(t+\tau_2) \cdot \sin(\omega t+\varphi_3)][code_1(t+\tau_1) \cdot \sin(\omega t+\varphi_1)]dt$$

$$Q_{PI} = \int_0^T [A_1 \cdot code_1(t+\tau_1) \cdot \sin(\omega t+\varphi_1) + A_2 \cdot code_2(t+\tau_2) \cdot \sin(\omega t+\varphi_2) + A_2 \cdot code_2(t+\tau_2) \cdot \sin(\omega t+\varphi_3)]$$
$$[code_1(t+\tau_1) \cdot \cos(\omega t+\varphi_1)]dt$$

$$I_{PI} = \int_0^T [A_1 \cdot code_1(t+\tau_1) \cdot \sin(\omega t+\varphi_1)][code_1(t+\tau_1) \cdot \sin(\omega t+\varphi_1)]dt -$$
$$A_2 \int_0^T [code_2(t+\tau_2) \cdot \sin(\omega t+\varphi_2)]$$
$$[code_1(t+\tau_1) \cdot \sin(\omega t+\varphi_1)]dt - A_3 \int_0^T [code_3(t+\tau_3) \cdot$$
$$\sin(\omega t+\varphi_3)][code_1(t+\tau_1) \cdot \sin(\omega t+\varphi_1)]dt$$

$$Q_{PI} = \int_0^T [A_1 \cdot code_1(t+\tau_1) \cdot \sin(\omega t+\varphi_1)][code_1(t+\tau_1) \cdot \cos(\omega t+\varphi_1)]dt -$$
$$A_2 \int_0^T [code_2(t+\tau_2) \cdot \sin(\omega t+\varphi_2)]$$
$$[code_1(t+\tau_1) \cdot \cos(\omega t+\varphi_1)]dt -$$
$$A_3 \int_0^T [code_3(t+\tau_3) \cdot \sin(\omega t+\varphi_3)]$$
$$[code_1(t+\tau) \cdot \cos(\omega t+\varphi_1)]dt$$

We would ideally like:

$$I'_{PI} = \int_0^T [\text{signal received}_{satelite1}(t)]$$

[local $code_{satelite1}(t)$ · in-phase local $carrier_{satelite1}(t)]dt$ $$Q'_{PI} = \int_0^T [\text{signal received}_{satelited1}(t)]$$

[local $code_{satelite1}(t)$ · quadratura local $carrier_{satelite1}(t)]dt$ i.e. by expanding:

$$I'_{PI} = \int_0^T [A_1 \cdot code_1(t+\tau_1) \cdot \sin(\omega t+\varphi_1)][code_1(t+\tau_1) \cdot \sin(\omega t+\varphi_1)]dt$$

$$Q'_{PI} = \int_0^T [A_1 \cdot code_1(t+\tau_1) \cdot \sin(\omega t+\varphi_1)][code_1(t+\tau_1) \cdot \cos(\omega t+\varphi_1)]dt$$

$$I'_{PI} =$$
$$I_{PI} - A_2 \int_0^T [code_2(t+\tau_2) \cdot \sin(\omega t+\varphi_2)][code_1(t+\tau_1) \cdot \sin(\omega t+\varphi_1)]dt -$$
$$A_3 \int_0^T [code_3(t+\tau_3) \cdot \sin(\omega t+\varphi_3)][code_1(t+\tau_1) \cdot \sin(\omega t+\varphi_1)]dt$$

$$Q'_{PI} = Q_{PI} - A_2 \int_0^T [code_2(t+\tau_2) \cdot \sin(\omega t+\varphi_2)]$$

-continued $$[code_1(t+\tau_1) \cdot \cos(\omega t + \varphi_1)]dt - A_3$$

$$\int_0^T [code_3(t+\tau_3) \cdot \sin(\omega t + \varphi_3)]$$

$$[code_1(t+\tau_1) \cdot \cos(\omega t + \varphi_1)]dt$$

given that:

$$I_{P12} = \int_0^T [code_2(t+\tau_2) \cdot \sin(\omega t + \varphi_2)][code_1(t+\tau_1) \cdot \sin(\omega t + \varphi_1)]dt$$

$$Q_{P12} = \int_0^T [code_2(t+\tau_2) \cdot \sin(\omega t + \varphi_2)][code_1(t+\tau_1) \cdot \cos(\omega t + \varphi_1)]dt$$

$$I_{P13} = \int_0^T [code_3(t+\tau_3) \cdot \sin(\omega t + \varphi_3)][code_1(t+\tau_1) \cdot \sin(\omega t + \varphi_1)]dt$$

$$Q_{P13} = \int_0^T [code_3(t+\tau_3) \cdot \sin(\omega t + \varphi_3)][code_1(t+\tau_1) \cdot \cos(\omega t + \varphi_1)]dt$$

and, neglecting the inter-satellite cross-correlation terms, and assuming that the local carriers are in phase with the carriers received:

$$I_{P22} = \int_0^T [A_2 \cdot code_2(t+\tau_2) \cdot \sin(\omega t + \varphi_2)][code_2(t+\tau_2) \cdot \sin(\omega t + \varphi_2)]dt = \frac{T}{2}A_2$$

$$I_{P33} = \int_0^T [A_3 \cdot code_3(t+\tau_3) \cdot \sin(\omega t + \varphi_3)]$$

$$[code_3(t+\tau_3) \cdot \sin(\omega t + \varphi_3)]dt = \frac{T}{2}A_3$$

We do indeed obtain the formulae proposed when we replace the correction terms with the corresponding terms $I_{Pix}$ and $Q_{Pix}$.

Likewise:

$$I'_{\Delta 1} =$$

$$I_{\Delta 1} - A_2 \int_0^T [code_2(t+\tau_2) \cdot \sin(\omega t + \varphi_2)][delta_1(t+\tau_1) \cdot \sin(\omega t + \varphi_1)]dt -$$

$$A_3 \int_0^T [code_3(t+\tau_3) \cdot \sin(\omega t + \varphi_3)][delta_1(t+\tau_1) \cdot \sin(\omega t + \varphi_1)]dt$$

$$Q'_{\Delta 1} = Q_{\Delta 1} -$$

$$A_2 \int_0^T [code_2(t+\tau_2) \cdot \sin(\omega t + \varphi_2)][delta_1(t+\tau_1) \cdot \cos(\omega t + \varphi_1)]dt -$$

$$A_3 \int_0^T [code_3(t+\tau_3) \cdot \sin(\omega t + \varphi_3)][delta_1(t+\tau_1) \cdot \cos(\omega t + \varphi_1)]dt$$

$$I_{\Delta 12} = \int_0^T [code_2(t+\tau_2) \cdot \sin(\omega t + \varphi_2)][delta_1(t+\tau_1) \cdot \sin(\omega t + \varphi_1)]dt$$

$$Q_{\Delta 12} = \int_0^T [code_2(t+\tau_2) \cdot \sin(\omega t + \varphi_2)][delta_1(t+\tau_1) \cdot \cos(\omega t + \varphi_1)]dt$$

In the case where the local carriers are not entirely in phase with the carriers received, on account of the dynamics (carrier, receiver clock, satellite) we show that:

for the first satellite Sat1:
for the punctual path:

$$I_{P1}' = I_{P11} - (I_{P22} \cdot I_{P12} - Q_{P22} \cdot Q_{P12}) \cdot 2/T - (I_{P33} \cdot I_{P13} - Q_{P33} \cdot Q_{P13}) \cdot 2/T$$

$$Q_{P1}' = Q_{P11} - (I_{P22} \cdot Q_{P12} - Q_{P22} \cdot I_{P12}) \cdot 2/T - (I_{P33} \cdot Q_{P13} + Q_{P33} \cdot I_{P13}) \cdot 2/T$$

on the delta path:

$$I_{\Delta 1}' = I_{\Delta 11} - (I_{P22} \cdot I_{\Delta 12} - Q_{P22} \cdot Q_{\Delta 12}) \cdot 2/T - (I_{P33} \cdot I_{\Delta 13} - Q_{P33} \cdot Q_{\Delta 13}) \cdot 2/T$$

$$Q_{\Delta 1}' = Q_{\Delta 11} - (I_{P22} \cdot Q_{\Delta 12} - Q_{P22} \cdot I_{\Delta 12}) \cdot 2/T - (I_{P33} \cdot Q_{\Delta 13} + Q_{P33} \cdot I_{\Delta 13}) \cdot 2/T$$

i.e. in complex notation, with $j^2 = -1$:

$$I_{Pi}' + jQ_{Pi}' = I_{Pii} + jQ_{Pii} - \Sigma_{\text{on } x \text{ different from } i}(I_{Pxx} + jQ_{Pxx})(I_{Pix} + jQ_{Pix})2/T$$

$$I_{\Delta i}' + jQ_{\Delta i}' = I_{\Delta ii} + jQ_{\Delta ii} - \Sigma_{\text{on } x \text{ different from } i}(I_{Pxx} + jQ_{Pxx})(I_{\Delta ix} + jQ_{\Delta ix})2/T$$

for the second satellite Sat2:

$$I_{P2}' + jQ_{P2}' = I_{P22} + jQ_{P22} - (I_{P11} + jQ_{P11})(I_{P21} + jQ_{P21})/T - (I_{P33} + jQ_{P33})(I_{P23} + jQ_{P23})/T$$

$$I_{\Delta 2}' + jQ_{\Delta 2}' = I_{\Delta 22} + jQ_{\Delta 22} - (I_{P11} + jQ_{P11})(I_{\Delta 21} + jQ_{\Delta 21})/T - (I_{P33} + jQ_{P33})(I_{\Delta 23} + jQ_{\Delta 23})/T$$

for the third satellite Sat3:

$$I_{P3}' + jQ_{P3}' = I_{P33} + jQ_{P33} - (I_{P11} + jQ_{P11})(I_{P31} + jQ_{P31})/T - (I_{P22} - jQ_{P22})(I_{P32} + jQ_{P32})/T$$

$$I_{\Delta 3}' + jQ_{\Delta 3}' = I_{\Delta 33} + jQ_{\Delta 33} - (I_{P11} + jQ_{P11})(I_{\Delta 31} + jQ_{\Delta 31})/T - (I_{P22} - jQ_{P22})(I_{\Delta 32} + jQ_{\Delta 32})/T$$

Generalization:
On the Punctual Path:

$$I_{Pi}' = I_{Pii} - \Sigma_{\text{on } x \text{ different from } i}(I_{Pxx} \cdot I_{Pix} - Q_{Pxx} \cdot Q_{Pix}) \cdot 2/T$$

$$Q_{Pi}' = Q_{Pii} - \Sigma_{\text{on } x \text{ different from } i}(I_{Pxx} \cdot Q_{Pix} - Q_{Pxx} \cdot I_{Pix}) \cdot 2/T$$

On the Delta Path:

$$I_{\Delta i}' = I_{\Delta ii} - \Sigma_{\text{on } x \text{ different from } i}(I_{Pxx} \cdot I_{\Delta ix} - Q_{Pxx} \cdot Q_{\Delta ix}) \cdot 2/T$$

$$Q_{\Delta i}' = Q_{\Delta ii} - \Sigma_{\text{on } x \text{ different from } i}(I_{Pxx} \cdot Q_{\Delta ix} - Q_{Pxx} \cdot I_{\Delta ix}) \cdot 2/T$$

i.e. in complex notation, with $j^2 = -1$:

$$I_{Pi}' + jQ_{Pi}' = I_{Pii} + jQ_{Pii} - \Sigma_{\text{on } x \text{ different from } i}(I_{Pxx} + jQ_{Pxx})(I_{Pix} + jQ_{Pix})2/T$$

$$I_{\Delta i}' + jQ_{\Delta i}' = I_{\Delta ii} + jQ_{\Delta ii} - \Sigma_{\text{on } x \text{ different from } i}(I_{Pxx} + jQ_{Pxx})(I_{\Delta ix} + jQ_{\Delta ix})2/T$$

In order to make the notation for the indices more systematic, the index ii labels the correlator channel Cii of the subset Si which handles the signal received, different from the other correlator channels Cix of the subset Si which, for their part, handle the local signals from the other satellites of respective order x, emanating from the correlator channels Cxx of the other subsets Sx.

In a variant of the receiver with correction of cross-correlation errors, according to the invention, the correlator channels are driven in baseband with signals I and Q.

Figure 4:
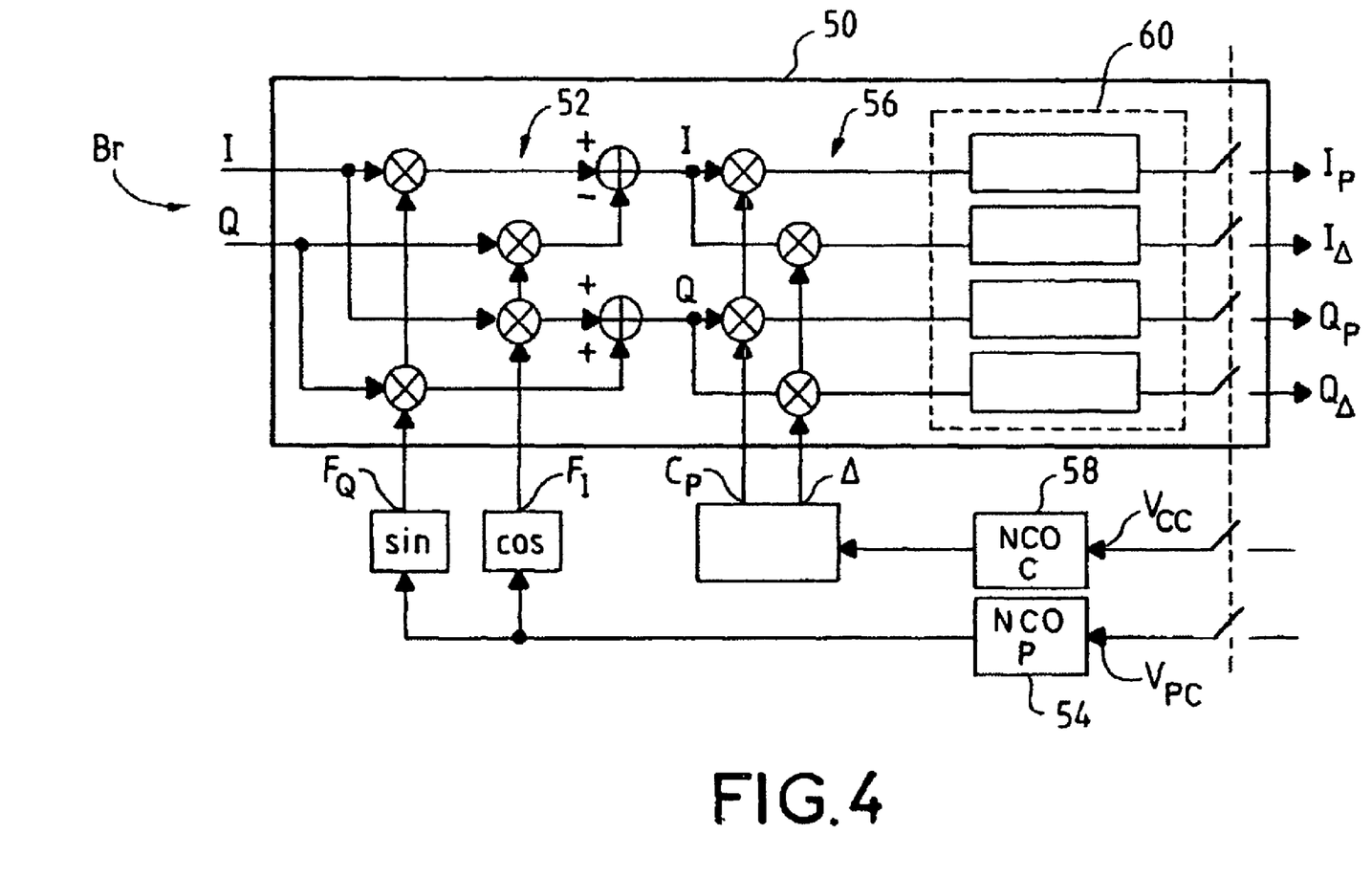
FIG. 4 shows a correlators channel operating in baseband.

FIG. 4 shows a correlator channel 50 operating with a signal received Br in baseband. As in the case of the correlator channel 10 of FIG. 1, the baseband correlator channel 50 comprises an in-phase and quadrature correlation path 52 between the baseband signal received, in the form of two signals I and Q in quadrature, and two respective local carriers $F_I, F_Q$. These local quadrature carriers (sine, cosine) are generated by an oscillator with digital control of carrier 54 (NCO p) of the receiver.

The signals I,Q output by the carrier correlation path are thereafter correlated in a code correlation path 56 with the local codes, punctual Cp and delta Δ, provided by a digital generator of local codes 58.

The code correlations are thereafter integrated by a respective integrator 60 so as to provide signals $I_P, I_\Delta, Q_P, Q_\Delta$ at the output of the correlator channel 50.

Figure 5:
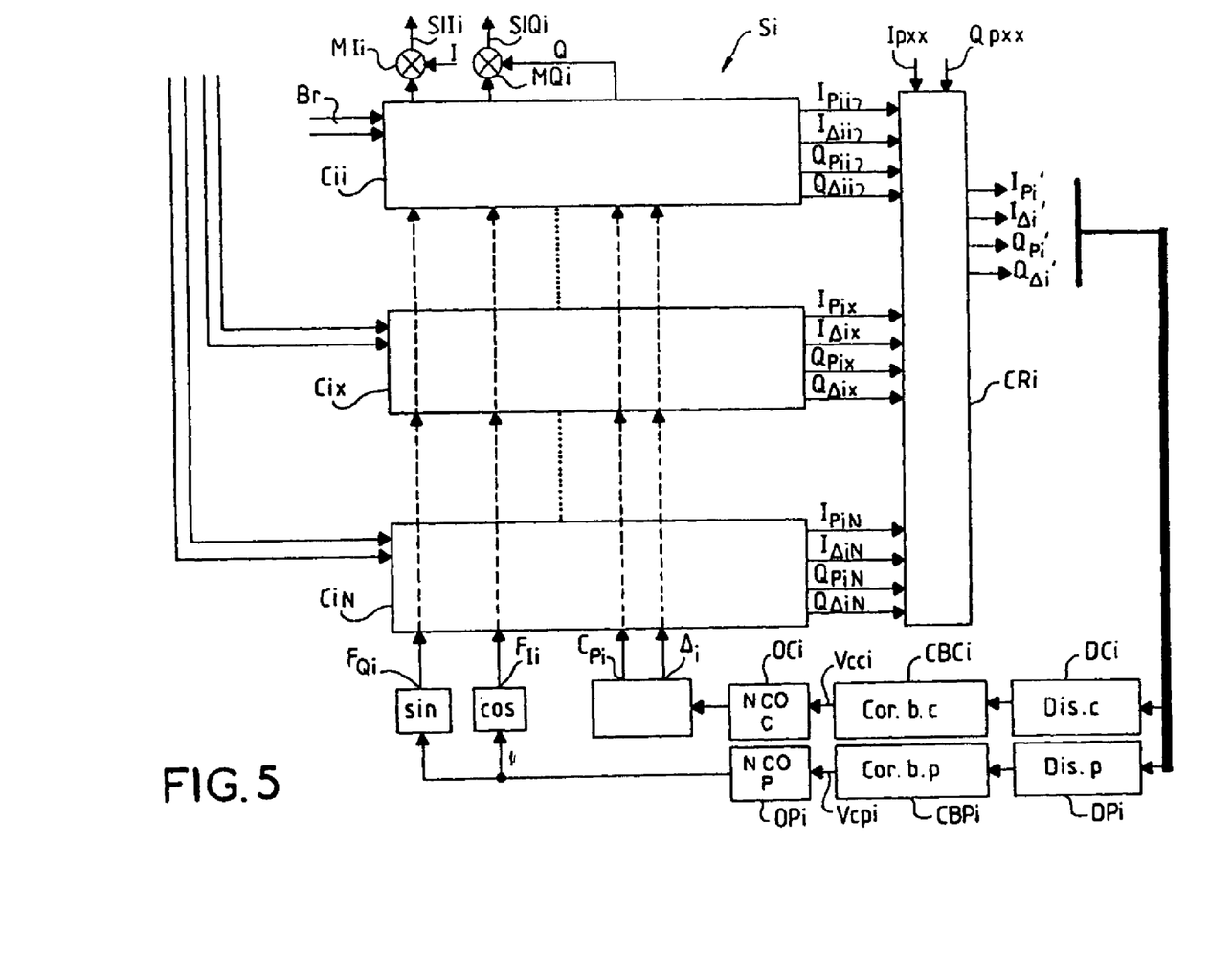
FIG. 5 shows a subset of the receiver according to the invention operating in baseband.

FIG. 5 shows a subset of rank i of the receiver according to the invention operating in baseband.

As in the receiver of FIG. 2 operating with the signals received, the baseband receiver comprises N reception subsets for N satellites received. Each subset Si of rank i, with i=2, 3, ... N, comprises a correlator channel Cii for a satellite received Sati and N-1 additional correlators Ci1, Cix, ... CiN for the additional satellites Sat1, Satx, ... SatN, with x different from i. The correlator channel Cii and the additional channels having the structure of the baseband correlator channel of FIG. 4. The subset Si furthermore comprises:

- an oscillator with digital control of carrier OPi (NCO p) for providing local carriers $F_{Ii}, F_{Qi}$ for the N correlators of the subset Si considered and a digital generator of local codes OCi (NCO c) for providing the local codes, punctual Cpi and delta Δi, for the N correlators of the subset Si considered;
- a first MIi and a second MQi multipliers providing for the other subsets of the receiver a first SLIi and a second SLQi local signals resulting from the modulation of the quadrature signals $F_{Ii}$ and $F_{Qi}$ of the local carrier by the punctual code Cpi of the subset considered, so as to perform the correlation of the code modulated by the carrier of the satellite considered with the codes modulated by the carrier of the other satellites;
- a correlation corrector CRi providing on the basis of the signals $I_{Pix}, I_{\Delta ix}, Q_{Pix}, Q_{\Delta ix}$ at the output of the N correlator channels of the subset considered Si and signals $I_{Pxx}, Q_{Pxx}$ at the output of the received-signal correlator channels of the other subsets Sx, with x different from i, corrected signals $I_{Pi}', I_{\Delta i}', Q_{Pi}' Q_{\Delta i}'$.
- a carrier discriminator Dpi providing through a carrier loop corrector CBPi a control signal Vcpi for the oscillator with digital control of carrier (NCO p) so as to provide local carriers $F_{Ii}, F_{Qi}$ for the N correlators of the subset Si considered;
- a code loop discriminator DCi providing through a code loop corrector CBCi a control signal Vcci for the digital generator of local codes OCi (NCO c) for providing the local codes, punctual Cpi and delta Δi for the N correlators of the subset Si considered.

Figure 6:
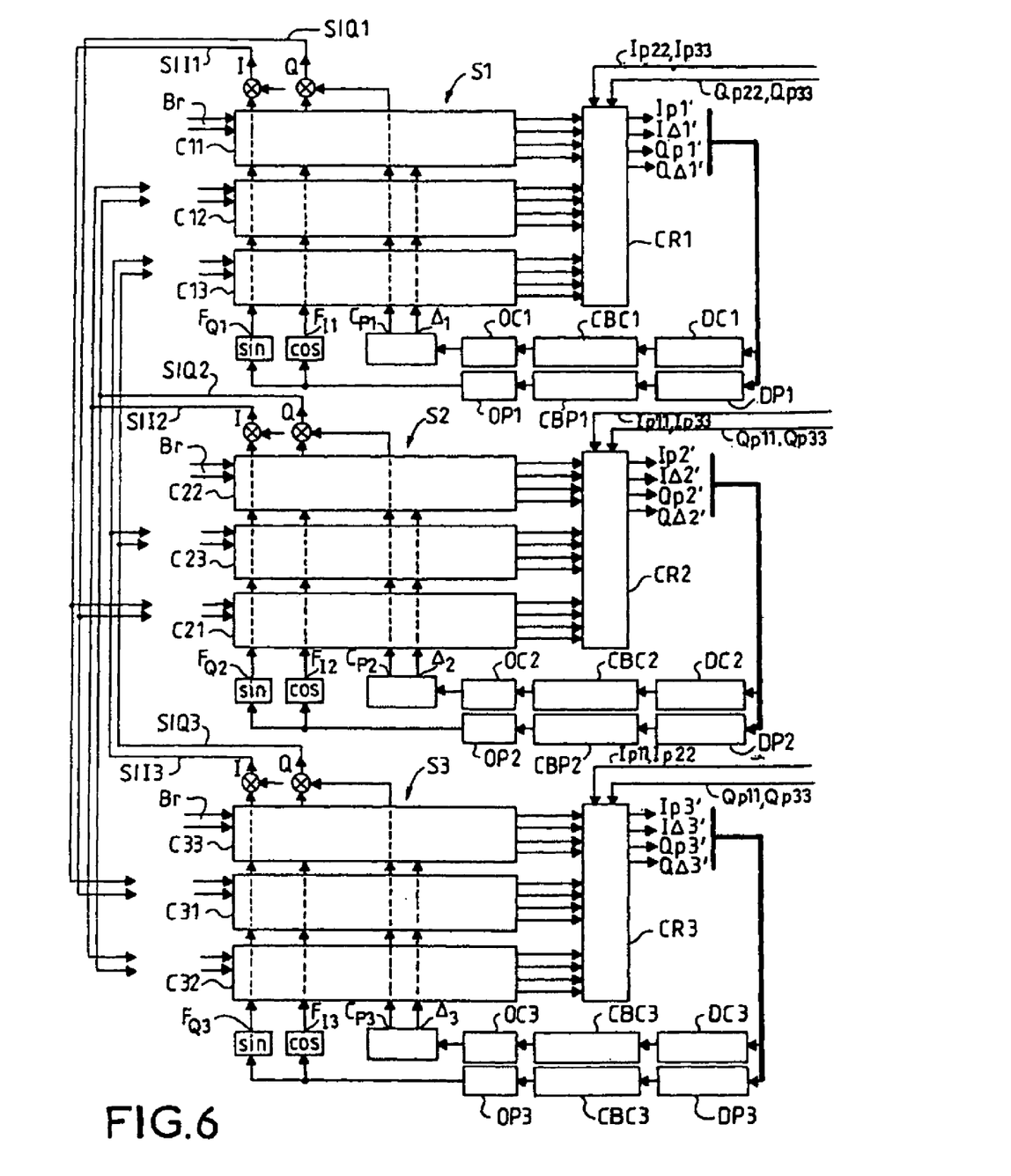
FIG. 6 shows a baseband receiver, according to the invention, for three satellites.

FIG. 6 shows a baseband receiver for three satellites Sat1, Sat2 and Sat3 comprising a first Si, a second S2 and a third S3 reception subsets having three correlator channels each. The reception subsets S1, S2 and S3 comprise the same elements as the detailed subset of FIG. 4 operating in baseband.

The receiver of FIG. 6 is configured to perform the same corrections as those of the receiver of FIG. 3 except that T/2 is replaced by T in the correction formulae.

For example for satellite 1:

$$I_{P1}'+jQ_{P1}'=I_{P11}+jQ_{P11}-(I_{P22}+jQ_{P22})(I_{P12}+jQ_{P12})/T-(I_{P33}+jQ_{P33})(I_{P13}+jQ_{13})/T$$

$$I_{\Delta 1}'+jQ_{\Delta 1}'=I_{\Delta 11}+jQ_{\Delta 11}-(I_{P22}+jQ_{P22})(I_{\Delta 12}+jQ_{\Delta 12})/T-(I_{P33}+jQ_{P33})(I_{\Delta 13}+jQ_{\Delta 13})/T$$

In a variant configuration, the receiver according to the invention uses three code correlators:
- an early path ($I_A$, $Q_A$),
- a punctual path ($I_P$, $Q_P$), and
- a late path ($I_R$, $Q_R$), the delta path being equivalent to the early path minus the late path.

In another variant of the receiver according to the invention, the same method is applied to the delta path reconstituted at the output of the correlators by the formulae:

$$I_{\Delta ix}=I_{Aix}-I_{Rix}$$

$$Q_{\Delta ix}=Q_{Aix}-Q_{Rix}$$

The cross-correlations are calculated twice in the above description. In fact, it is possible to economize on the correlators by virtue of the formula below:

For the first satellite Sat1, we calculate $(I_P, I_\Delta, Q_P, Q_\Delta)_{12}$ and $(I_P, I_\Delta, Q_P, Q_\Delta)_{13}$ in addition to $(I_P, I_\Delta, Q_P, Q_\Delta)_{11}$ $$I_{P1}'+jQ_{P1}'=I_{P11}+jQ_{P11}-(I_{P22}+jQ_{P22})(I_{P12}+jQ_{P12})/T-(I_{P33}+jQ_{P33})(I_{P13}+jQ_{P13})/T$$

$$I_{\Delta 1}'+jQ_{\Delta 1}'=I_{\Delta 11}+jQ_{\Delta 11}-(I_{P22}+jQ_{P22})(I_{\Delta 12}+jQ_{\Delta 12})/T-(I_{P33}+jQ_{P33})(I_{\Delta 13}+jQ_{\Delta 13})/T$$

For the second satellite Sat2, we calculate $(I_P, I_\Delta, Q_P, Q_\Delta)_{23}$ in addition to $(I_P, I_\Delta, Q_P, Q_\Delta)_{22}$ $$I_{P2}'+jQ_{P2}'=I_{P22}+jQ_{P22}-(I_{P11}+jQ_{P11})(I_{P12}+jQ_{P12})/T-(I_{P33}+jQ_{P33})(I_{P23}+jQ_{P23})/T$$

$$I_{\Delta 2}'+jQ_{\Delta 2}'=I_{\Delta 22}+jQ_{\Delta 22}-(I_{P11}+jQ_{P11})(I_{\Delta 12}-jQ_{\Delta 12})/T-(I_{P33}+jQ_{P33})(I_{\Delta 23}+jQ_{\Delta 23})/T$$

For the third satellite Sat3, nothing is calculated in addition to $(I_P, I_\Delta, Q_P, Q_\Delta)_{33}$ $$I_{P3}'+jQ_{P3}'=I_{P33}+jQ_{P33}-(I_{P11}+jQ_{P11})(I_{P13}+jQ_{P13})/T-(I_{P22}+jQ_{P22})(I_{P23}-jQ_{P23})/T$$

$$I_{\Delta 3}'+jQ_{\Delta 3}'=I_{\Delta 33}+jQ_{\Delta 33}-(I_{P11}+jQ_{P11})(I_{\Delta 13}+jQ_{\Delta 13})/T+(I_{P22}+jQ_{P22})(I_{\Delta 23}-jQ_{\Delta 23})/T$$

Generalizing, for x>i:

$$I_{Pxi}=+I_{Pix}$$

$$Q_{Pxi}=-Q_{Pix}$$

$$I_{\Delta xi}=-I_{66\ ix}$$

$$Q_{\Delta xi}=+Q_{\Delta ix}$$

To summarize, instead of having $N^2-N$ correlator channels in addition we have $(N^2-N)/2$ of them.

The terms $I_{Pii}$ and $Q_{Pii}$ in the formulae, estimation of the complex amplitude of the signals received respectively from the satellites i, take no account of the corrections. In order to improve the accuracy, they could be replaced by $I_{Pi}'$ and $Q_{Pi}'$ in the formulae. In this case, they become:

$$I_{Pi}'+jQ_{Pi}'=I_{Pii}+jQ_{Pii}-\Sigma_{on\ x\ different\ from\ i}(I_{Px}'+jQ_{Px}')(I_{Pix}+jQ_{Pix})2/T$$

$$I_{\Delta i}'+jQ_{\Delta i}'=I_{\Delta ii}+jQ_{\Delta ii}-\Sigma_{on\ x\ different\ from\ i}(I_{Px}'+jQ_{Px}')(I_{\Delta ix}+jQ_{\Delta ix})2/T$$

The problem which then arises is that the application of the formulae demands inputs $I_{Pi}'$ and $Q_{Pi}'$ which are themselves the outputs of the calculation. In order to overcome this, in a variant of the receiver according to the invention, at each iteration of the calculation, the corrected terms $I_{Pi}'$ and $Q_{Pi}'$ of the previous iteration may be used, initializing the calculation with uncorrected terms $I_{Pii}$ and $Q_{Pii}$, after the acquisition and convergence phase:

$$(I_{Pi}'+jQ_{Pi}')_n=(I_{Pii}+jQ_{Pii})_n-\Sigma_{on\ x\ different\ from\ i}(I_{Px}'+jQ_{Px}')_{n-1}\cdot(I_{Pix}+jQ_{Pix})2/T$$

$$(I_{\Delta i}'+jQ_{\Delta i}')_n=(I_{\Delta ii}+jQ_{\Delta ii})_n-\Sigma_{on\ x\ different\ from\ i}(I_{Px}'+jQ_{Px}')_{n-1}\cdot(I_{Pix}+jQ_{Pix})2/T$$

The iteration indexed by n may be either over time, corresponding in each instance to new data, or that of a recursive calculation converging to the ideal solution. In a variant of the receiver according to the invention, when the signal received is filtered (limited spectrum), it is possible and recommended to apply the same filtering to the local signals. On the other hand, this makes it necessary to install a filter for each local signal, hence one per satellite, contrary to the signal received, of which there is only one.

We shall see hereinbelow a method of acquisition of the signal by the receiver according to the invention.

A first satellite is acquired, without correction, by a conventional open-loop search process, well known to those skilled in the art. On completion of this process we switch to tracking, we deduce therefrom the local signal of this first satellite and we correct the cross-correlations on the other channels in the search phase (in open loop). This makes it possible to acquire the weakest satellites (last) while reducing the risk of a mistake on account of a correlation with the signal from another more powerful satellite.

Each time a new satellite is acquired and tracked, we calculate and we apply the cross-correlation corrections in respect of the measurements of all the other satellites already tracked.

The receiver according to the invention exhibits excellent stability. Specifically, because the cross-correlation coefficients are appreciably less than 1 (−24 dB for the C/A codes), the tracking loops are stable and converge to a state where there is no longer any cross-correlation error.

The receiver according to the invention allows the estimation of cross-correlation errors in real time, on the punctual and delta aggregate samples I and Q, by virtue of additional channels, by correlation between the local codes of the satellites tracked and the correction of the punctual and delta aggregate samples I and Q ahead of the code and carrier phase discriminators.

The receiver according to the invention completely eliminates the errors of cross-correlation between all the satellites whose signal is tracked, in the steady state, after a phase of fast convergence. The residual errors, due to thermal noise and to the tailing off of the loops, depend on the signal-to-noise ratio, on the dynamics and on the loop bands. For applications with very weak dynamics (ground station) the gain of the procedure may be very substantial, changing the measurement error from a few meters to a few tens of centimeters, i.e. a factor of 10.

It will be readily seen by one of ordinary skill in the art that the present invention fulfills all of the objects set forth above. After reading the foregoing specification, one of ordinary skill will be able to affect various changes, substitutions of equivalents and various other aspects of the invention as broadly disclosed herein. It is therefore intended that the protection granted hereon be limited only by the definition contained in the appended claims and equivalents thereof.

the integrator (20).

The invention claimed is:

1. A satellite-based positioning receiver with correction of inter-satellite cross-correlation errors, comprising:

a correlation channel Cii of order i per satellite received, with i=1, 2, . . . N, N being the number of satellites received (Sat1, Sat2, . . . SatN);

each correlator channel Cii having:

a carrier correlation path, in-phase and quadrature, between the signal received and two respective local quadrature carriers (sine, cosine) generated by an oscillator with digital control of carrier;

a code correlation path based on the signals I, Q output by the in-phase and quadrature carrier correlation path, with the local codes of the satellite received, provided by a digital generator of local codes; and an integrator for providing, for each local code, signals $I_c$ $Q_c$ at the output of the correlator channel Cii of the satellite received, c designating each of the local codes, wherein for each correlator channel Cii of the satellite received as many additional correlator channels Cix as additional satellites received with x=1, 2, . . . N and x different from i, and in that the local codes of the satellite received are correlated with the local codes of the other additional satellites Cix.

2. The satellite-based positioning receiver as claimed in claim 1, wherein the local codes of the satellite received for the code correlation path are a punctual code and a delta code, the code correlation path including two correlation paths:

a punctual path $(I_P,Q_P)$, a delta path $(I_\Delta,Q_\Delta)$.

3. The satellite-based positioning receiver as claimed in claim 1, wherein the local codes of the satellite received for the code correlation path are a punctual code, an early code and a late code, and in that the integrator provides signals $(I_P,Q_P,I_A,Q_A,I_R,Q_R)$, the code correlation path comprising three correlation paths:

an early path $(IA,Q_A)$, a punctual path $(I_P,Q_P)$, and a late path $(I_R,Q_R)$, the delta path being reconstituted from the early path minus the late path by the formulae:

$$I_\Delta=I_A-I_R$$

$$Q_\Delta=Q_A-Q_R.$$

4. The satellite-based positioning receiver as claimed in claim 1, wherein it comprising N reception subsets Si, each subset Si of rank i having the correlator channel Cii of the signal of the satellite received of order i and N-1 additional correlator channels Ci1,Ci2, . . . Cix, . . . CiN for the additional satellites received, x=1, 2, . . . N and x different from i, each received signal correlator channel Cii being driven by its reception input by the signal received, each of the additional correlator channels of a subset Si, receiving respectively, on the one hand, at its received-signal input, a local signal Slox resulting from the modulation of the local carrier by the punctual local code of the correlator channel Cxx of the satellite received of order x, and on the other hand, at its local carrier and local codes local inputs, the respective local quadrature carriers and the local codes of the correlator channel of the signal received from the satellite of order i.

5. The satellite-based positioning receiver as claimed in claim 4, wherein each correlator channel Cix of rank x in the subset Si, with x=1, 2, . . . N, comprises:

the in-phase and quadrature carrier correlation path between the signal received and two respective quadrature local carriers (sine, cosine);

the code correlation path based on the signals I, Q at the output of the in-phase and quadrature carrier correlation path with the punctual and delta (Δi) local codes of the satellite of order i;

an integrator (20) for providing signals $I_{Pix}, I_{\Delta ix}, Q_{Pix}, Q_{\Delta ix}$ at the output of the correlator channel, the subset Si furthermore comprising:

an oscillator with digital control of carrier for providing local carriers $F_{Ii}, F_{Qi}$ for the N correlators of the subset Si considered and a digital generator of local codes for providing the local codes, punctual and delta, for the N correlators of the subset Si considered;

a multiplier Mi providing for the other subsets Sx of the receiver a local signal, resulting from the modulation of the local carrier by the punctual code of the subset considered Si, so as to perform the correlation of the code modulated by the carrier of the satellite considered with the codes modulated by the carriers of the other satellites;

a correlation corrector CRi providing on the basis of the signals $I_{Pix}, I_{\Delta ix}, Q_{Pix}, Q_{\Delta ix}$ at the output of the N correlator channels of the subset considered, x taking, for these signals $I_{Pix}, I_{\Delta ix}, Q_{Pix}, Q_{\Delta ix}$, the values 1 to N, and signals $I_{Pxx}, I_{Qxx}$ output by the received-signal correlator channels Cxx of the other subsets Sx, corrected signals $I_{Pi}', I_{\Delta i}', Q_{Pi}', Q_{\Delta i}'$;

a carrier discriminater DPi providing through a carrier loop corrector CBPi a control signal Vcpi for the oscillator with digital control of carrier so as to provide local carriers for the N correlators of the subset Si considered;

a code loop discriminator DCi providing through a code loop corrector CBCi a control signal Vcci for the digital generator of local codes for providing the local codes, punctual and delta for the N correlators of the subset Si considered.

6. The satellite-based positioning receiver as claimed in claim 1, wherein it comprises a first, a second and a third reception subset having three correlator channels each for receiving three satellites.

7. The satellite-based positioning receiver as claimed in claim 6, wherein the first, second, and third subsets of the receiver respectively comprise a first, a second and a third signal correlator channels driven at their reception input by the signal Sr received by the receiver, each subset furthermore comprising:

in the first subset, two other additional correlator channels driven respectively at their reception input by local signals emanating respectively from a multiplier and from a multiplier, the signal resulting from the modulation of the local carrier $F_{I2}$ by the punctual code of the second satellite and the signal Slo3 resulting from the modulation of the local carrier $F_{I3}$ by the punctual code of the third satellite;

in the second subset, two other additional correlator channels and driven respectively at their reception input by local signals emanating respectively from a multiplier and from a multiplier, the signal resulting from the modulation of the local carrier $F_{I1}$ by the punctual code of the first satellite;

in the third subset, two other additional correlator channels and driven at their reception input by the local signals emanating respectively from the multipliers and;

each correlator of each of the subsets comprising:

the in-phase and quadrature carrier correlation path between the signal at their reception input and two respective quadrature local carriers (sine, cosine), $F_{I1}, F_{Q1}$ for the first subset $F_{I2}, F_{Q2}$ for the second and $F_{I3}, F_{Q3}$ for the third, these carriers being generated respectively, for each of the subsets by a first, a second and a third oscillators with digital control of carrier;

the code correlation path based on the signals I, Q at the output of the in-phase and quadrature carrier correlation path with the local codes, punctual and delta of the satellites respectively of order 1, 2, 3, provided by a digital generator of local codes respectively for each subset;

an integrator per correlator channel for respectively providing signals $I_{P1x}, I_{\Delta 1x}, Q_{P1x}, Q_{\Delta 1x}$ at the output of the correlator channel C1x; $I_{P2x}, I_{\Delta 2x}, Q_{P2x}, Q_{\Delta 2x}$ at the output of the correlator channel C2x and $I_{P3x}, I_{\Delta 3x}, Q_{P3x}, Q_{\Delta 3x}$ at the output of the correlator channel C3x, with x=1, 2, 3, each subset of three correlators comprising:

a corrector of correlations providing on the basis of the signals $I_{Pix}, I_{\Delta ix}, Q_{Pix}, Q_{\Delta ix}$, with i=1, 2, 3, at the output of the N correlator channels of the subset considered and of the signals $I_{Pxx}, Q_{Pxx}$, at the output of the received-signals correlator channels (of order x) of the other subsets (Sx), of the corrected signals $I_{P1}', I_{\Delta 1}', Q_{P1}', Q_{\Delta 1}'$ at the output of the first corrector Cr1, $I_{P2}', I_{\Delta 2}', Q_{P2}', Q_{\Delta 2}'$ at the output of the second corrector Cr2, $I_{P3}', I_{\Delta 3}', Q_{P3}', Q_{\Delta 3}$ at the output of the third corrector, the signals $I_{Pxx}, Q_{Pxx}$ at the output of the received-signal correlator channels, driving the correctors, being the signals $I_{P22}, I_{P33}, Q_{P22}, Q_{P33}$ for the corrector Cr1, $I_{P11}, I_{P33}, Q_{P11}, Q_{P33}$ for the corrector and $I_{P11}, I_{P22}, Q_{P11}, Q_{P22}$ for the corrector, a carrier discriminator respectively providing through a carrier loop corrector a control signal for the respective oscillator with digital control of carrier so as to provide local carriers $F_{I1}, F_{Q1}$, for the first subset $F_{I2}, F_{Q2}$ for the second subset and $F_{I3}, F_{Q3}$ for the third subset;

a code loop discriminator respectively providing through a code loop corrector a respective control signal Vcc1, Vcc2, Vcc3 for the digital generator of local codes so as to provide the local codes, punctual and delta for the three correlators of the first subset for the three correlators of the second subset and for the three correlators of the third subset.

8. The satellite-based positioning receiver as claimed in claim 6 wherein it is configured to perform the following corrections:

for the first satellite Sat1:

on the punctual path:

$$I_{P1}' = I_{P11} - I_{P22} \cdot I_{P12} \cdot 2/T - I_{P33} \cdot I_{P13} \cdot 2/T$$

$$Q_{P1}' = Q_{P11} - I_{P22} \cdot Q_{P12} \cdot 2/T - I_{P33} \cdot Q_{P13} \cdot 2/T$$

on the delta path:

$$I_{\Delta 1}' = I_{\Delta 11} - I_{P22} \cdot I_{\Delta 12} \cdot 2/T - I_{P33} \cdot I_{\Delta 13} \cdot 2/T$$

$$Q_{\Delta 1}' = Q_{\Delta 11} - I_{P22} \cdot Q_{\Delta 12} \cdot 2/T - I_{P33} \cdot Q_{\Delta 13} \cdot 2/T$$

i.e. in complex notation, with $j^2 = -1$:

$$I_{P1}' + jQ_{P1}' = I_{P11} + jQ_{P11} - I_{P22}(I_{P12} + jQ_{P12}) \cdot 2/T - I_{P33}(I_{P13} + jQ_{P13}) \cdot 2/T$$

$$I_{\Delta 1}' + jQ_{\Delta 1}' = I_{\Delta 11} + jQ_{\Delta 11} - I_{P22}(I_{\Delta 12} + jQ_{\Delta 12}) \cdot 2/T - I_{P33}(I_{\Delta 13} + jQ_{\Delta 13}) \cdot 2/T$$

with $$\frac{T}{2} = \int_0^T (\text{local signal}(t))^2 dt,$$

T integration period of the integrator (20).

9. The satellite-based positioning receiver as claimed in claim 5 wherein in that in the case where the local carriers are not entirely in phase with the carriers received it is shown that:

for the first satellite Sat1:
on the punctual path:

$$I_{P1}'=I_{P11}-(I_{P22}\cdot I_{P12}-Q_{P22}\cdot Q_{P12})\cdot 2/T-(I_{P33}\cdot I_{P13}-Q_{P33}\cdot Q_{P13})\cdot 2/T$$

$$Q_{P1}'=Q_{P11}-(I_{P22}\cdot Q_{P12}-Q_{P22}\cdot I_{P12})\cdot 2/T-(I_{P33}\cdot Q_{P13}-Q_{P33}\cdot I_{P13})\cdot 2/T$$

on the delta path:

$$I_{\Delta 1}'=I_{\Delta 11}-(I_{P22}\cdot I_{\Delta 12}-Q_{P22}\cdot Q_{\Delta 12})\cdot 2/T-(I_{P33}\cdot I_{\Delta 13}-Q_{P33}\cdot Q_{\Delta 13})\cdot 2/T$$

$$Q_{\Delta 1}'=Q_{\Delta 11}-(I_{P22}\cdot Q_{\Delta 12}+Q_{P22}\cdot I_{\Delta 12})\cdot 2/T-(I_{P33}\cdot Q_{\Delta 13}+Q_{P33}\cdot I_{\Delta 13})\cdot 2/T$$

i.e. in complex notation, with $j^2=-1$:

$$I_{P1}'+jQ_{P1}'=I_{P11}+jQ_{P11}-(I_{P22}+jQ_{P22})(I_{P12}+jQ_{P12})2/T-(I_{P33}+jQ_{P33})(I_{P13}+jQ_{P13})2/T$$

$$I_{\Delta 1}'+jQ_{\Delta 1}'=I_{\Delta 11}+jQ_{\Delta 11}-(I_{P22}+jQ_{P22})(I_{\Delta 12}+jQ_{\Delta 12})2/T-(I_{P33}+jQ_{P33})(I_{\Delta 13}+jQ_{\Delta 13})2/T$$

for the second satellite Sat2:

$$I_{P2}'+jQ_{P2}'=I_{P22}+jQ_{P22}-(I_{P11}+jQ_{P11})(I_{P21}+jQ_{P21})2/T-(I_{P33}+jQ_{P33})(I_{P23}+jQ_{P23})2/T$$

$$I_{\Delta 2}'+jQ_{\Delta 2}'=I_{\Delta 22}+jQ_{\Delta 22}-(I_{P11}+jQ_{P11})(I_{\Delta 21}+jQ_{\Delta 21})2T-(I_{P33}+jQ_{P33})(I_{\Delta 23}+jQ_{\Delta 23})2/T$$

and in that for the third satellite Sat3:

$$I_{P3}'+jQ_{P3}'=I_{P33}+jQ_{P33}2-(I_{P11}+jQ_{P11})(I_{P31}+jQ_{P31})/T-(I_{P22}-jQ_{P22})(I_{P32}+jQ_{P32})/T$$

$$I_{\Delta 3}'+jQ_{\Delta 3}'=I_{\Delta 33}+jQ_{\Delta 33}-(I_{P11}+jQ_{P11})(I_{\Delta 31}+jQ_{\Delta 31})2/T-(I_{P22}-jQ_{P22})(I_{\Delta 32}+jQ_{\Delta 32})2/T$$

and in that generally:
on the punctual path:

$$I_{Pi}'=I_{Pii}-\Sigma \text{ on x different from } i(I_{Pxx}\cdot I_{Pix}-Q_{Pxx}\cdot Q_{Pix})\cdot 2/T$$

$$Q_{Pi}'=Q_{Pii}-\Sigma \text{ on x different from } i(I_{Pxx}\cdot Q_{Pix}+Q_{Pxx}\cdot I_{Pix})\cdot 2/T$$

on the delta path:

$$I_{\Delta i}'=I_{\Delta ii}-\Sigma_{\text{on x different from } i}(I_{Pxx}\cdot I_{\Delta ix}-Q_{Pxx}\cdot Q_{\Delta ix})\cdot 2/T$$

$$Q_{\Delta i}'=Q_{\Delta ii}-\Sigma_{\text{on x different from } i}(I_{Pxx}\cdot Q_{\Delta ix}-Q_{Pxx}\cdot I_{\Delta ix})\cdot 2/T$$

i.e. in complex notation, with $j^2=-1$:

$$I_{Pi}'+jQ_{Pi}'=I_{Pii}+jQ_{Pii}-\Sigma_{\text{on x different from } i}(I_{Pxx}'+jQ_{Pxx})(I_{Pix}+jQ_{Pix})2/T$$

$$I_{\Delta i}'+jQ_{\Delta i}'=I_{\Delta ii}+jQ_{\Delta ii}-\Sigma_{\text{on x different from } i}(I_{Pxx}+jQ_{Pxx})(I_{\Delta ix}+jQ_{\Delta ix})2/T.$$

10. The satellite-based positioning receiver as claimed in claim 1 wherein in that each correlator channel operates with a signal received (Br) in baseband, in the form of two signals I and Q in quadrature.

11. The satellite-based positioning receiver as claimed in claim 10, wherein the baseband correlator channel comprises an in-phase and quadrature correlation path between the baseband signal received, in the form of two signals I and Q in quadrature, and two respective local carriers $F_I, F_Q$, these local quadrature carriers (sine, cosine) being generated by an oscillator with digital control of carrier of the receiver.

12. The satellite-based positioning receiver as claimed in claim 11, wherein the baseband receiver comprises N reception subsets for N satellites received, each subset Si of rank i, with i=1, 2, 3, . . . N, comprises a correlator channel Cii for a satellite received Sati and N-1 additional correlators Ci1,Cix, . . . CiN for the additional satellites Sat1,Satx, . . . . SatN, with x different from i, the correlator channel Cii and the additional channels of each subset Si furthermore comprising:

a first MIi and a second MQi multipliers providing for the other subsets of the receiver a first SLIi and a second SLQi local signals resulting from the modulation of the quadrature signals $F_{Qi}$ and FIi of the local carrier by the punctual code Cpi of the subset considered, so as to perform the correlation of the code modulated by the carrier of the satellite considered with the codes modulated by the carrier of the other satellites.

13. The satellite-based positioning receiver as claimed in claim 10 wherein it is configured to perform the following corrections:

for the first satellite Sat1:

$$I_{P1}'+jQ_{P1}'=I_{P11}+jQ_{P11}-(I_{P22}+jQ_{P22})(I_{P12}+jQ_{P12})/T-(I_{P33}+jQ_{P33})(I_{P13}+jQ_{P13})/T$$

$$I_{\Delta 1}'+jQ_{\Delta 1}'=I_{\Delta 11}+jQ_{\Delta 11}-(I_{P22}+jQ_{P22})(I_{\Delta 12}+jQ_{\Delta 12})/T-(I_{P33}+jQ_{P33})(I_{\Delta 13}+jQ_{\Delta 13})/T.$$

14. The satellite-based positioning receiver as claimed in claim 3 wherein the delta path is reconstituted at the output of the correlators by the formulae:

$$I_{\Delta ix}=I_{Aix}-I_{Rix}$$

$$Q_{\Delta ix}=Q_{Aix}-Q_{Rix}.$$

15. The satellite-based positioning receiver as claimed in claim 1 wherein to economize on correlators, the cross-correlations are calculated by:

for the first satellite Sat1, by $(I_P,I_\Delta,Q_P,Q_\Delta)_{12}$ and $(I_P,I_\Delta,Q_P,Q_\Delta)_{13}$ in addition to $(I_P,I_\Delta,Q_P,Q_\Delta)_{11}$ $$I_{P1}'+jQ_{P1}'=I_{P11}+jQ_{P11}-(I_{P22}+jQ_{P22})(I_{P12}+jQ_{P12})/T-(I_{P33}+jQ_{P33})(I_{P13}+jQ_{P13})/T$$

$$I_{\Delta 1}'+jQ_{\Delta 1}'=I_{\Delta 11}+jQ_{\Delta 11}-(I_{P22}+jQ_{P22})(I_{\Delta 12}+jQ_{\Delta 12})/T-(I_{P33}+jQ_{P33})(I_{\Delta 13}+jQ_{\Delta 13})/T$$

for the second satellite Sat2, by $(I_P,I_\Delta,Q_P,Q_\Delta)_{23}$ in addition to $(I_P,I_\Delta,Q_P,Q_\Delta)_{22}$ $$I_{P2}'+jQ_{P2}'=I_{P22}+jQ_{P22}-(I_{P11}+jQ_{P11})(I_{P12}-jQ_{P12})/T-(I_{P33}+jQ_{P33})(I_{P23}+jQ_{P23})/T$$

$$I_{\Delta 2}'+jQ_{\Delta 2}'=I_{\Delta 22}+jQ_{\Delta 22}+(I_{P11}+jQ_{P11})(I_{\Delta 12}-jQ_{\Delta 12})/T-(I_{P33}+jQ_{P33})(I_{\Delta 23}+jQ_{\Delta 23})/T$$

and in that for the third satellite Sat3, nothing is calculated in addition to $(I_P,I_\Delta,Q_P,Q_\Delta)_{33}$ $$I_{P3}'+jQ_{P3}'=I_{P33}+jQ_{P33}-(I_{P11}+jQ_{P11})(I_{P13}-jQ_{P13})/T-(I_{P22}+jQ_{P22})(I_{P23}-jQ_{P23})/T$$

$$I_{\Delta 3}'+jQ_{\Delta 3}'=I_{\Delta 33}+jQ_{\Delta 33}+(I_{P11}+jQ_{P11})(I_{\Delta 13}-jQ_{\Delta 13})/T+(I_{P22}+jQ_{P22})(I_{\Delta 23}-jQ23)/T$$

and in that by generalizing t, for x>i:

$$I_{Pxi}=+I_{Pix}$$

$Q_{Pxi} = -Q_{Pix}$ $I_{\Delta xi} = -I_{\Delta ix}$ $Q_{\Delta xi} = +Q_{\Delta ix}.$ 16. The satellite-based positioning receiver as claimed in claim 1 wherein in order to improve the accuracy of the estimation of the complex amplitude of the signals received respectively from the satellites i, the terms $I_{Pii}$ and $Q_{Pii}$ in the formulae are replaced with the terms $I_{Pi}'$ and $Q_{Pi}'$, the formulae then becoming:

$I_{Pi}' + jQ_{Pi}' = I_{Pii} + jQ_{Pii} - \Sigma_{on\ x\ different\ from\ i}(I_{Px}' + jQ_{Px}')(I_{Pix} + jQ_{Pix})2/T$ $I_{\Delta i}' + jQ_{\Delta i}' = I_{\Delta ii} + jQ_{\Delta ii} - \Sigma_{on\ x\ different\ from\ i}(I_{Px}' + jQ_{Px}')(I_{\Delta ix} + jQ_{\Delta ix})2/T.$ 17. The satellite-based positioning receiver as claimed in claim 16, wherein at each iteration of the calculation, the corrected terms $I_{Pi}'$ and $Q_{Pi}'$ of the previous iteration are used, initializing the calculation with uncorrected terms $I_{Pii}$ and $Q_{Pii}$, after the acquisition and convergence phase:

$(I_{Pi}' + jQ_{Pi}')_n = (I_{Pii} + jQ_{Pii})_n - \Sigma_{on\ x\ different\ from\ i}(I_{Px}' + jQ_{Px}')_{n-1} \cdot (I_{Pix} + jQ_{Pix})_n \cdot 2/T$ $(I_{\Delta i}' + jQ_{\Delta i}')_n = (I_{\Delta ii} + jQ_{\Delta ii})_n - \Sigma_{on\ x\ different\ from\ i}(I_{Px}' + jQ_{Px}')_{n-1} \cdot (I_{\Delta ix} + jQ_{\Delta ix})_n \cdot 2/T.$ 18. The satellite-based positioning receiver as claimed in claim 1 wherein in that when the signal received is filtered (limited spectrum), the same filtering is applied to the local signals.

19. The satellite-based positioning receiver as claimed in claim 1 wherein in that a first satellite is acquired, without correction, by a conventional open-loop search process, in that on completion of this process we switch to tracking, we deduce therefrom the local signal of this first satellite and we correct the cross-correlations on the other channels in the search phase (in open loop) and in that each time a new satellite is acquired and tracked, we calculate and we apply the cross-correlation corrections in respect of the measurements of all the other satellites already tracked.

* * * * *